Patented Sept. 3, 1935

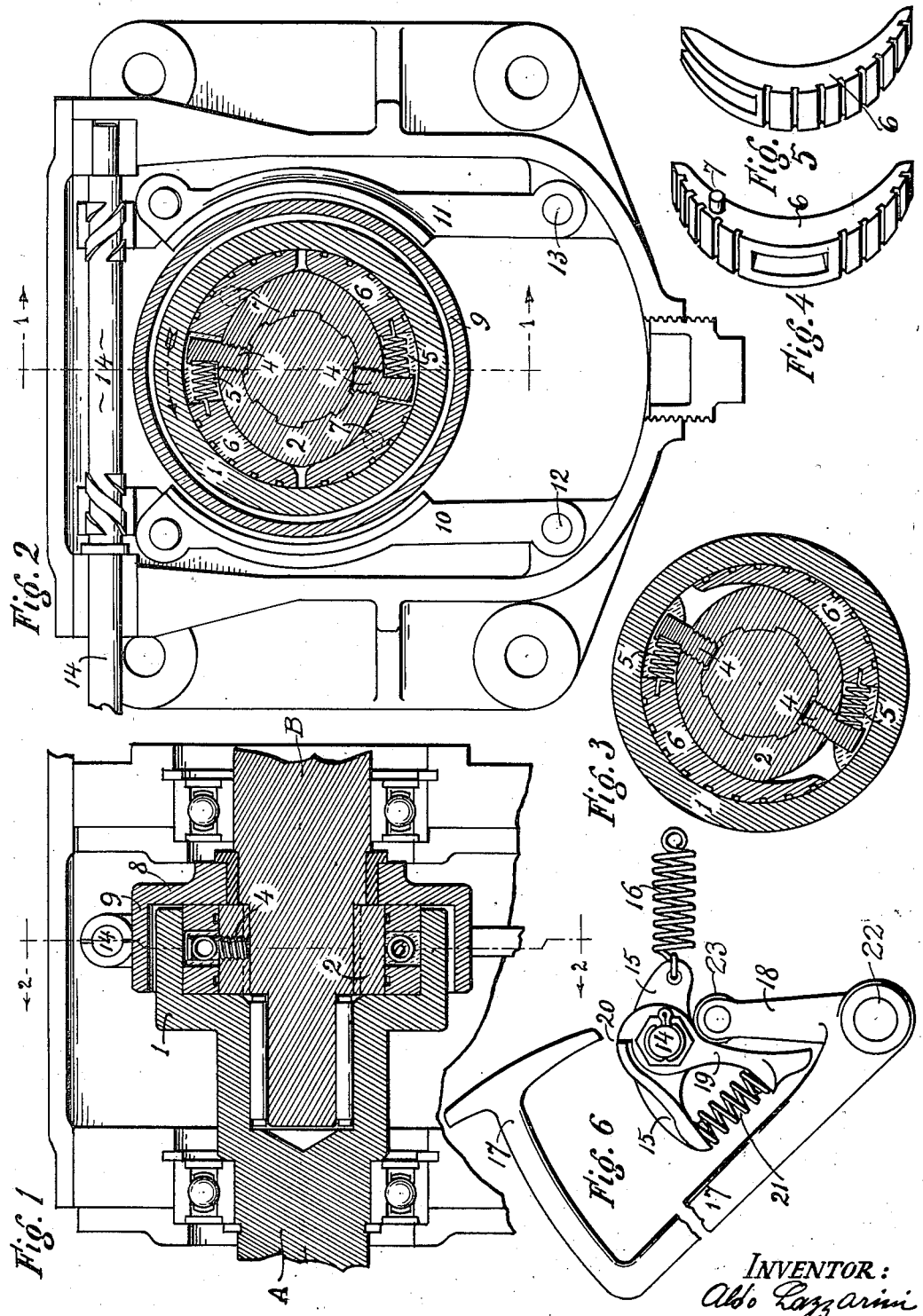

2,013,413

UNITED STATES PATENT OFFICE 2,013,413

ONE-WAY FREEWHEELING CLUTCH AND MEANS TO CONTROL ITS OPERATION

Aldo Lazzarini, Flushing, N. Y.

Application September 15, 1934, Serial No. 744,122

7 Claims. (Cl. 192—43)

The principal object of this invention is to produce such features in a free-wheeling clutch whereby the control of the same may be effected at the operator's will without need of his disconnecting the transmission to which it is a part, preliminary to the setting of the clutch, and again have to connect the same transmission thereafter; or without need of his locking the freewheel previous to setting the transmission in reverse speed and then reset the free-wheel again in the forward speed.

Another object of this invention is to provide controlling facilities that allow the instantaneous locking of the clutch at any moment during its free-wheel operation, that may be required.

Another object of this invention, when applied to an automobile, is to make it possible to operatively associate the aforesaid controlling means to control-levers that are already existing, thereby avoiding to complicate the cares and attentions of the operator, on the contrary causing him subconsciously to lock the clutch or set it free, as the need may be.

Other features of this invention are the great amount of working friction available in proportion to the clutch's size, its compactness of assembly, the strength of its parts, together with a characteristic outline of the central cam-piece that will make possible its construction by a simple and inexpensive cutting of a machine-tool.

The accompanying drawing shows in Fig. 1 a vertical section of the clutch through the axis of rotation; in Fig. 2 a section of the same clutch through a plane of rotation indicated by line 2—2 of Fig. 1; in Fig. 3 a similar section of a simplified form of this invention; in Fig. 4 a perspective view of a shoe-pawl which is part of the clutch shown in Fig. 2; in Fig. 5 a perspective view of a shoe-pawl which is part of the simplified clutch shown in Fig. 3; and in Fig. 6 a typical connection of the clutch's controls to an outside standard control lever.

In Fig. 1, drum 1 is connected to the shaft A of the motive-power plant and forms the outer element of the clutch. A central cam-piece 2 is attached to the driven shaft B leading to the wheels. Both pieces are to run on a common axis and drum 1 houses within its cylindrical cavity the central cam-piece as well as all the essential parts of the clutch.

The transverse section of the central cam-piece is identical to the geometrical figure defined by the overlapping portions of two equal eccentric circles.

Two threaded pins 4 are screwed to the cam-piece diametrically opposite to each other and somewhere between the two summits of the cam. These pins are to project as far out as permitted by the clear rotation of drum 1. On their side toward the longest portion of the cam's curve, they are provided with a face and a lip-edge to suitably form the abutment for a resilient spring 5.

Interposed between the drum and the cam, and surrounding the latter, are two shoe-pawls 6 that will about complement the shape of the cam to the cylindrical cavity of the drum. Each is approximately in outline the form of a crescent moon. Fig. 4 shows one of these pawls in perspective view, and also shows that a radial slot is cut midway of it in order to admit within itself that part of pin 4 which projects from the cam, allowing to the same a certain angular play. Resilient springs 5 are also located within said slots of the shoe-pawls, one end of them abutting against the flat face of pins 4, the other end pressing upon the opposite face of the slot, thereby causing the shoe-pawls to slide toward the summit of the cam in the direction indicated by the arrow in Fig. 2 and incidentally lodging it tightly between the cam and the inside cylindrical face of the drum.

It is evident that if torque is applied to drum 1 in the direction shown by the arrow in Fig. 2, and the central cam-piece 2 is idle or resists that torque, the tension of springs 5 and the initial friction of the drum upon the shoe-pawls will cause the latter to act as a wedge-stop between the drum and the cam whereby all elements of the clutch will be locked together. Should the central cam-piece 2 cease to resist to the torque and assume a speed of its own in the same direction and in excess of the speed of the drum, the shoe-pawls will recede upon the cam just enough to release their grip upon the drum, and will revolve with said cam-piece faster than, and sliding within, said drum.

In order to make more efficient the frictional adherence of the shoe-pawls upon the inner cylindrical surface of the drum, a plurality of grooves parallel to the axis of rotation may be incised upon the outer curved surface of the shoe-pawls, as illustrated; these grooves will also serve for the escape of the lubricating oil. The surface of the shoe-pawls which is resting upon the cam may have, instead, grooves in the rotational directions so as to aid their slipping upon it (see Fig. 1).

The usefulness of this clutch within the transmission of an automobile is that of providing a free-wheeling run whenever the speed of the vehicle exceeds the relative speed of the motive-plant in such cases as during descending a grade or at a time when the vehicle is wanted to run by the momentum previously accumulated. Evidently a clutch as described is one permanently set for free-wheeling operation provided the conditions of travel induce the coasting of the vehicle.

It being of great importance that the pneumatic braking power of the gas engine when overrun by the vehicle, be made available to the will of the operator, certain controls are provided with this clutch for the locking of the free-wheeling elements when so wanted. Whenever the vehicle runs faster than the relative speed of the engine shaft, the cam-piece 2, which is related to the vehicle speed, will rotate faster than the drum, since the latter is connected to the shaft of the power-plant.

If springs 5 are artificially compressed while such condition prevails, the clutch will lock, this time through the other end of the shoe-pawls. The pneumatic resistance offered by the slower speed of the gas-motor in relation to the speed of the vehicle will thus be called into play.

The controls which render this operation possible consist of the following: A stud-pin 7 projects from one side of each shoe-pawl, and the pins loosely fit into properly spaced holes of a disk member 8, rotatably mounted upon the driven shaft alongside of the clutch.

Said disk terminates with a cylindrical rim 9, upon which a frictional retardation may be applied by pressing a pair of jaws 10 and 11, as shown in Fig. 2 or by any known braking arrangement.

The braking jaws 10 and 11 are hinged to supports 12 and 13, their other ends being guided by two opposite helical threads cut upon shaft 14. The operation of jaws 10 and 11 is therefore dependent upon a partial turn of said shaft and the direction of that turn will determine whether the jaws will close upon, or open from, rim 9. As it is, the jaws are normally kept open by the action upon shaft 14 of rocker-arm 15 and spring 16 (see Fig. 6). Notice in Fig. 2 that shaft 14 is conveniently passed to the exterior of the casing. Upon this outer extension of said shaft are connected the parts shown in Fig. 6.

In an automobile, one of many ways to command the controlling means just described is to link them to the pedal-lever of the wheel-brakes. It is an essential condition in adopting this connection that the operation of said controlling means be made effective before the wheel-brakes begin to apply friction, which is the same as to say that the pedal-lever must have an angle of slack depression in regard to the brakes, which angle is to be operative in relation to the controlling of the one-way clutch.

Fig. 6 shows both pedal-lever 17 and lever 18 rigidly connected together upon fulcrum 22. A roller 23 is yoked at the extremity of lever 18. Shaft 14, besides carrying the rocker-arm 15, loosely supports the cam-lever 19, its angular play being limited by appropriate butting stops 20. Upon this cam-lever is to eventually operate the roller 23 of lever 18. A resilient spring 21 is interposed between the opposite face of said cam-lever and one side of rocker-arm 15 in order to cause the braking jaws 10 and 11 to never apply more than a yielding friction upon rim 9.

This controlling arrangement makes it practically subconscious for the operator to call into play the pneumatic resistance of the gas-motor whenever he wants to slow down the vehicle's speed. By slightly pressing upon the pedal-lever, only the resistance of the gas-motor will cause the slowing, but if a stop is wanted, by further depressing the pedal lever, the wheel brakes will be set in operation.

Assuming that the vehicle is running by its own momentum on account of the operator having curtailed the power output of the motor, or that the vehicle is descending a grade and is allowed to run solely by its gravity, the operator may desire at a certain point to check the vehicle speed. This may be done by him by pressing lightly with his foot upon the brake-pedal. As above explained, that will not operate the wheel brakes as long as he keeps his foot pressure within the established limit of slack play of the said brakes. But the small depression of the foot lever thus effected is sufficient to cause cam-lever 19 to swing so far as to take a tangential position upon the arc described by the extremity of lever 18. Said angular displacement of cam-lever 19 will of necessity impel spring 21 and rocker-lever 15 in the same swinging direction, thus effecting a partial turn of shaft 14. Due to such turning and to the two opposite helical threads provided on said shaft, the closing of the pair of braking jaws 10 and 11 upon rim 9 will be effected, therefore, as above explained, the free-wheeling clutch will be caused to lock its elements in a rigid coupling. When the operator lifts his foot entirely from the brake pedal, contraction spring 16 will cause all the above linked parts to return to their normal position corresponding to jaws 10 and 11 being set open and out of contact with rim 9.

It is obvious that if the controlling means just described are considered superfluous for special applications of this invention where a permanent free overrunning one-way clutch is demanded, not only the above described controlling elements are to be omitted, but also the shoe-pawls need not be provided with double wedge contour, since they will set the clutch into engagement only through one of their ends.

Fig. 5 shows the extent of modification to said shoe-pawls, and Fig. 3 shows a clutch devoid of controlling means and including a pair of said modified shoe-pawls.

Having thus completed my description, I claim as my invention:

1. A reversible one-way clutch comprised of a drum; an elliptical central cam-piece journalled within the same and having a pair of diametrically opposite projecting pins; a pair of two-way shoe-pawls adapted to fit between the cam and the drum and having a middle oblong slot to accommodate each of said pins with some angular play; a spring within said slot abutting against the pin and impelling the shoe-pawl in the rotational direction for locking the drum and the central cam-piece in a wedge-like manner; a disk trained to the shoe-pawls; a braking arrangement to retard the disk rotation; and connections to operate said braking arrangement at will for the purpose of reversing the locking operation of the shoe-pawls.

2. A reversible one-way clutch comprised of a drum; a central cam-piece having a profile formed by two equal eccentric arcs; a pair of stud-pins radially projecting at opposite points of said cam; a pair of two-way shoe-pawls to slidably rest upon the cam and loosely fit upon the drum's inner cylinder, said shoe-pawls having a radial oblong slot within which the aforesaid stud-pins are allowed a certain angular play; a resilient spring interposed between each pin and one face of the slot in order to press the shoe-pawls against the drum; a disk trained to the shoe-pawls and having a frictional rim; a braking arrangement to operate upon said rim; and connections to link said braking arrangement to an exterior lever in order to reverse at will the locking operation of the shoe-pawls in conjunction with a change of torque conditions within the clutch.

3. A reversible one-way clutch comprised of a drum; an aligned central cam-piece, the outline of which is like that of the overlapping portion of two equal eccentric circles; a pair of stud-pins radially projecting at opposite points of the cam; a pair of two-way shoe-pawls loosely fitting between the cam and the inner surface of the drum, said shoe-pawls being provided at their middle with a radial oblong slot to accommodate each stud-pin of the cam with some angular play; a resilient spring interposed between each pin and one face of each slot for forcing each shoe-pawl into frictional engagement with the drum whenever a torque is applied to the drum in the engaging direction; a disk trained to the shoe-pawls having a frictional rim; a braking arrangement to operate upon the said frictional rim, and connections to link said braking arrangement to an exterior lever, thereby capacitating the clutch to reverse its locking grip at will and upon the transposition of the torque from one clutch element to the other.

4. A reversible one-way clutch comprised of a drum; a central cam-piece formed by two equal eccentric arcs of cylinders; a pair of two-way shoe-pawls to fit loosely between the cam and the drum; a disk trained to the shoe-pawls; a spring to keep the shoe-pawls and the disk advanced upon the cam; a braking arrangement to operate upon the disk; and connections to link said braking arrangement to an exterior lever.

5. A lockable free-wheeling clutch, comprised of a drum; a coaxial central cam-piece having an outline formed by two equal eccentric arcs; a pair of stud-pins radially projecting from the cam; a pair of two-way shoe-pawls slidably fitting between the cam and the inner cylindrical surface of the drum, said shoe-pawls being provided with a clearing aperture admitting the stud-pins and allowing a play in the rotational plane; a spring amid the clearing aperture of each shoe-pawl, abutting against the stud-pins so as to impel the shoe-pawls to lock the clutch with a driving torque; a disk connected to the shoe-pawls; a braking arrangement to retard the disk rotation; and connections to operate said braking arrangement at will for the purpose of reversing the locking operation of the shoe-pawls.

6. A one-way clutch comprised of a drum; an elliptical central cam-piece journalled within the same and having a pair of stud-pins radially projecting at opposite points; a pair of shoe-pawls adapted to frictionally contact with said drum while resting upon said cam-piece; clearing apertures in said shoe-pawls admitting the stud-pins and allowing them to play in the rotational plane; and a spring amid the clearing aperture of each shoe-pawl, abutting against the stud-pins so as to impel the shoe-pawls to lock the drum and the central cam-piece together on a given direction of rotation.

7. A one-way clutch comprised of a drum; a coaxial central cam-piece having a profile formed by the overlapping portions of two equal eccentric circles; a pair of stud-pins radially projecting from opposite points of the cam; a pair of shoe-pawls slidably fitting between the cam and the cylindrical inner surface of the drum, said shoe-pawls being each provided with a clearing aperture for guiding upon one of said stud-pins; a resilient spring seated within each clearing aperture, abutting against the stud-pins and forcing the shoe-pawls into frictional engagement with the drum whenever a torque is applied to either the drum or the cam-piece in a driving direction.

ALDO LAZZARINI.